United States Patent [19]

Petros

[11] 3,850,287
[45] Nov. 26, 1974

[54] TRANSFER BEAM CONVEYOR
[75] Inventor: Andrew J. Petros, Oakdale, Pa.
[73] Assignee: Mesta Machine Company, Pittsburgh, Pa.
[22] Filed: Feb. 5, 1973
[21] Appl. No.: 329,538

[52] U.S. Cl. ............................................... 198/219
[51] Int. Cl. ............................................ B65g 25/04
[58] Field of Search ................................... 198/219

[56] References Cited
UNITED STATES PATENTS

| | | | |
|---|---|---|---|
| 2,076,739 | 4/1937 | Menough | 198/219 |
| 2,275,433 | 3/1942 | Herold et al. | 198/219 |
| 2,642,179 | 6/1953 | Cross | 198/219 |
| 2,658,608 | 11/1953 | Wehmiller | 198/219 |
| 2,684,769 | 7/1954 | Wallerius et al. | 198/219 |
| 2,973,856 | 3/1961 | Brooks | 198/219 |
| 3,221,870 | 6/1965 | Pagay | 198/219 |
| 3,512,628 | 5/1970 | Keough | 198/219 |

Primary Examiner—Richard A. Schacher
Assistant Examiner—Richard K. Thomson
Attorney, Agent, or Firm—Donn J. Smith

[57] ABSTRACT

A transfer beam conveyor comprises a first elongated support structure, a second elongated support structure, an arrangement for mounting the first structure at a stationary position with respect to the length of the conveyor, and an arrangement for mounting the second structure for longitudinal movement relative to the conveyor and to the first structure. A mechanism is provided for reciprocating the second structure longitudinally of the first structure, together with mechanism for elevating each of the support structures so that a number of loads can be indexed therealong at essentially constant elevation.

9 Claims, 8 Drawing Figures

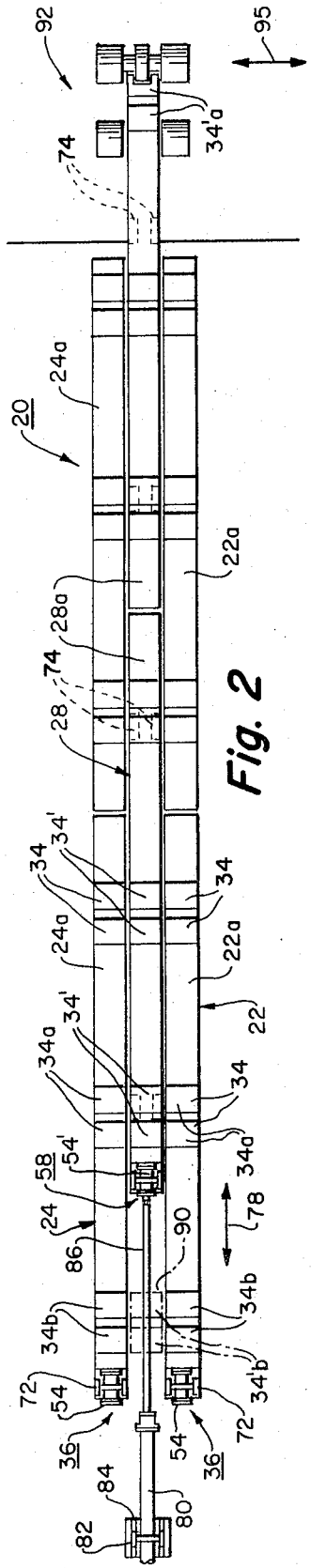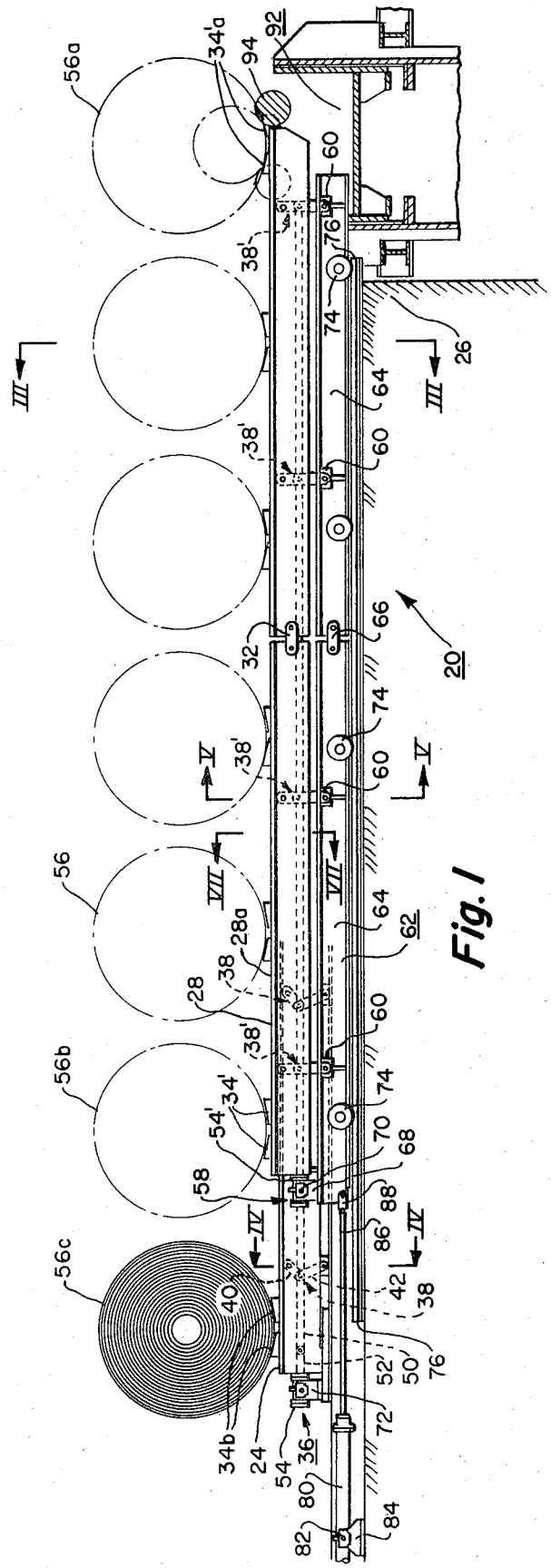

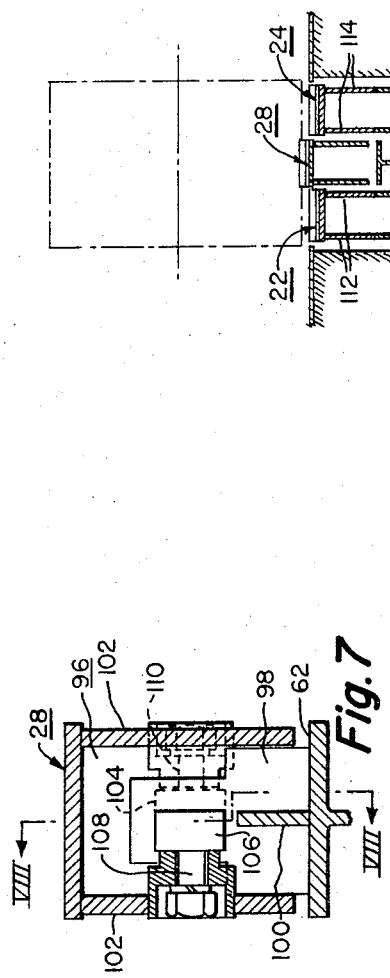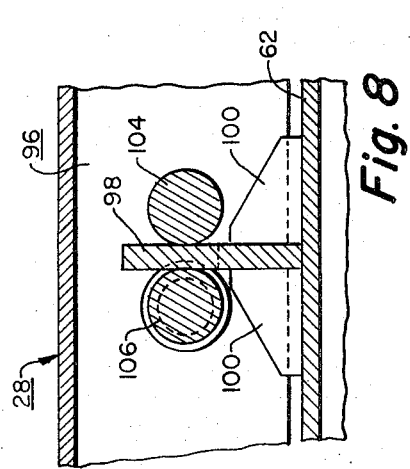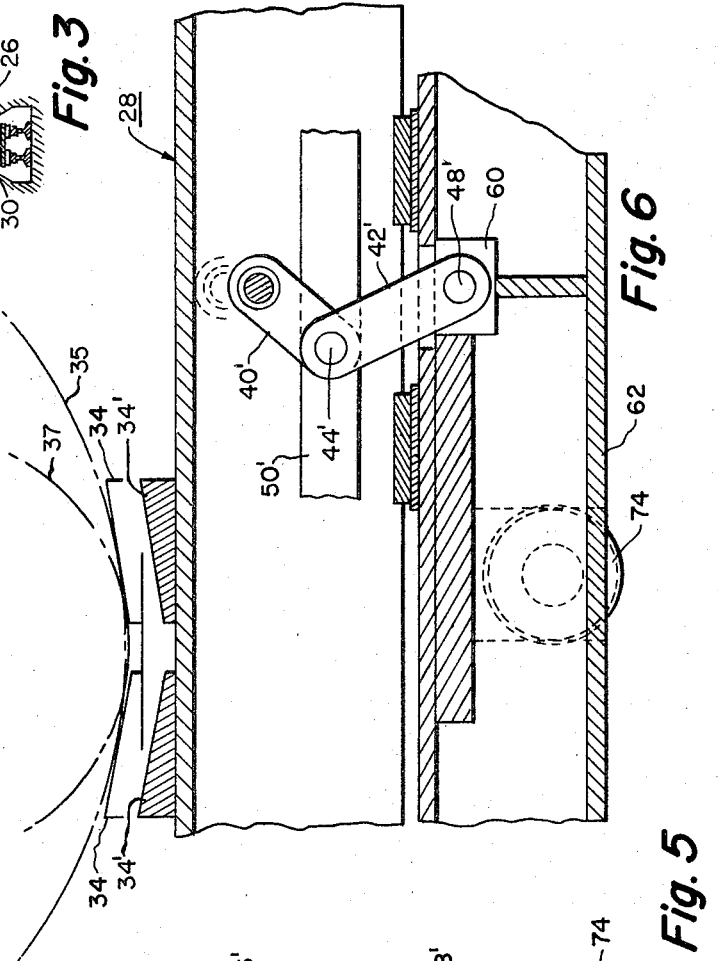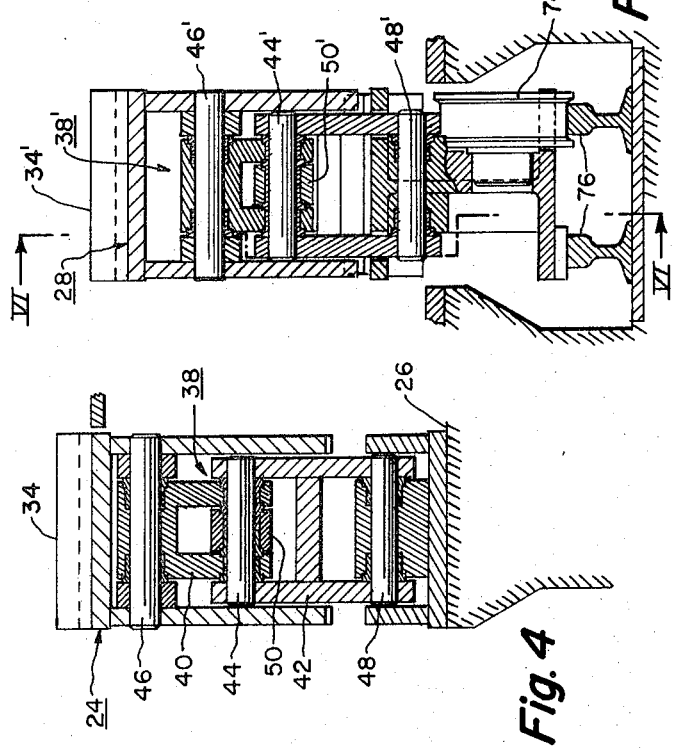

3,850,287

TRANSFER BEAM CONVEYOR

The present invention relates to a transfer beam conveyor and more particularly to a conveyor of the character described adapted for transferring very heavy loads without elevation thereof as the loads are moved along the length of the conveyor.

Walking beam type conveyors have been known for many years and are useful in transferring heavy loads, particularly in a hostile environment. For example in the steel industry walking beam conveyors have been extensively used for conveying tubes, bars, and other structural shapes through relatively long annealing furnaces, cooling beds, and the like. In a typical walking beam conveyor a number of alloy supports or beams are arranged in rows of two or more beams to the row, along the length of the conveyor. The beams are staggered with the ones immediately ahead, and are placed in longitudinal slots in the furnace or cooling bed hearth or otherwise in the conveyor structure. The beams are alternately raised, moved forward, and then lowered, by means of toggles or cams to deposit the load step-wise on succeeding beams along the length of the walking beam conveyor.

As each beam or support of a typical walking beam conveyor is thus raised, advanced, and lowered again the structure of the conveyor is quite complex with the result that maintenance is frequent and difficult. Certain types of loads, moreover, are easily damaged or gouged by the supports of the conveyor from either the extreme weight of the loads or their comparative fragility. This difficulty is accentuated where, through wear or design considerations, the moving supports of a conventional walking beam conveyor are not completely synchronized. Alluding again to the steel industry, although the conveyor of the invention is not limited thereto, the transportation of strip coils is exceedingly difficult as their edges are relatively easily gouged by projections of the transfer or conveyance mechanism, owing to the great weight of the coils.

For conventional walking beam conveyors, a considerable foundation or other relatively deep support structure is necessary to accommodate a service pit and the raising and lowering of the load supports. A further difficulty is encountered with known conveyors of the category during entering and delivering of the load relative to the conveyor, owing to the repetitive elevation of the load with cyclic raising and lowering of the load supports or walking beams along the length of the conveyor.

I overcome these disadvantages by providing what may be termed a "transfer beam conveyor" with relatively few moving parts arranged in a simplistic design. Maintenance is diminished extensively, and what little maintenance is required is rendered less difficult. The beams of the transfer beam conveyor are arranged such that extremely heavy loads can be transferred therebetween without varying the elevation of the loads. Thus a large proportion of the power complement of the conveyor is obviated, as the load or loads need not be raised or lowered at more or less controlled rates and against the action of gravity. The mechanical linkages for transferring power to the moving supports of the conveyor consequently can be of lighter construction and are much less subject to wearing. Transferring the load along my novel conveyor at constant elevation promotes greater versatility in entering and delivering various types of loads relative to the transfer beam conveyor of the invention. Thus, especially constructed conveyance means are not always necessary for entering and delivering loads relative to the conveyor of the invention. Finally construction difficulties are further obviated by the use of a shallower foundation or other supporting structure for the transfer beam conveyor, as permitted by more simplistic actuating mechanisms. Load transport at essentially constant elevation facilitates synchronization of the moving components of my novel conveyor and also prevents gouging of even very heavy loads.

For purposes of illustration, but not limitative of the invention, the conveyor illustrated herein is arranged for transferring strip coils. Obviously the conveyor can be arranged with equal facility for transferring other types and/or shapes of loads.

I accomplish these desirable results and overcome the disadvantages of the prior art by providing a conveyor construction comprising a first elongated support structure, a second elongated support structure, means for mounting said first structure at a stationary position with respect to the length of said conveyor, means for mounting said second structure for longitudinal movement relative to said conveyor and said first structure, means for reciprocating said second structure longitudinally of said first structure, and means for elevating each of said support structures so that at least one load can be indexed therealong at essentially constant elevation.

I also desirably provide a similar conveyor construction wherein said first structure includes a pair of laterally spaced and generally parallel beam supports, and said second structure is mounted therebetween for movement longitudinally thereof.

I also desirably provide a similar conveyor construction wherein each of said support structures includes at least two longitudinally adjacent segments.

I also desirably provide a similar conveyor construction wherein said second support structure has segments thereof mounted respectively on individual segments of carriage means for longitudinally reciprocating said second support structure.

I also desirably provide a similar conveyor construction wherein said elevating means include a number of toggle mechanisms spaced along the length of each of said first and said second support structures for supporting said structures, the toggle mechanisms of each of said structures being connected to a draw bar therefor, and means for reciprocating said draw bar to raise and lower said support structures, in the case of said second support structure said reciprocating means therefor being mounted thereon for longitudinal movement therewith.

I also desirably provide a conveyor construction comprising a longitudinally stationary support structure, a longitudinally movable support structure, said movable support structure being supported from a car riage substantially coextending therewith by a number of toggle mechanisms spaced therealong, said toggle mechanisms being actuated by a draw bar extending along the length of said second support structure, means mounted on said carriage for reciprocating said draw bar for raising and lowering said second support structure relative to said carriage, a plurality of load bearing stations spaced along the length of each of said support structures and laterally alignable one with the other, and means for reciprocating said carriage and said second support structure between positions of lateral alignment of said second support stations with successively adjacent first support stations.

I also desirably provide a similar conveyor construction wherein said second support structure and said carriage means are subdivided into longitudinal segments, means are provided for loosely joining end-to-end the segments of said second support structure and the respectively associated segments of said carriage means.

During the foregoing discussion, various objects, features and advantages of the invention have been set forth. These and other objects, features and advantages of the invention together with structural details thereof will be elaborated upon during the forthcoming description of certain presently preferred embodiments of the invention and presently preferred methods of practicing the same.

In the accompanying drawings I have shown certain presently preferred embodiments of the invention and have illustrated certain presently preferred methods of practicing the same, wherein:

FIG. 1 is a side elevational view of one arrangement of a transfer beam type conveyor according to the invention;

FIG. 2 is a top plan view of the conveyor as shown in FIG. 1, with the loads shown in FIG. 1 having been removed for purposes of clarity;

FIG. 3 is a cross sectional view of the conveyor shown in FIG. 1 and taken along reference line III—III thereof;

FIG. 4 is an enlarged partial cross sectional view of a toggle mechanism associated with an outer movable beam of the conveyor;

FIG. 5 is an enlarged partial cross sectional view showing the toggle and carriage mechanisms of a central movable beam of the conveyor;

FIG. 6 is a partial longitudinally sectioned view of the conveyor structure as shown in FIG. 5 and taken along reference line VI—VI thereof;

FIG. 7 is an enlarged partial cross sectional view of the apparatus as shown in FIG. 1 and taken along reference line VII—VII thereof; and FIG. 8 is a partial longitudinally sectioned view of the apparatus as shown in FIG. 7 and taken along reference line VIII—VIII thereof.

With reference now more particularly to the drawings, my novel and exemplary conveyor construction 20 shown therein comprises a pair of outer, elevatable beam supports 22, 24 (FIGS. 2 & 3), one of which is illustrated in FIG. 1. The outer beams 22, 24 are supported on a suitable foundation 26 in laterally spaced, generally parallel relation. Betwen the outer beams 22, 24 an elevatable and longitudinally movable inner or central beam support 28 is mounted on the carriage structure 64 (FIGS. 1 & 3) described below. For convenience in assembly and construction each of the inner and outer beams 22, 24, 28 can be segmented along the lengths into discrete segments 22a, 24a, 28a respectively, which can be more or less loosely joined by pivoted links 32 or the like. Similarly the carriage structure 64 for the inner walking beam 28 can be similarly divided into longitudinal segments 62.

Each of the inner and outer supports can be provided with suitable load bearing pallets 34. As better shown in FIG. 6 the load bearing pallets 34 in the illustrated example are shaped for supporting and transporting strip coils having maximum and minimum relative diameters denoted by chain outlines 35, 37 thereof respectively. Obviously other shapes of pallets or load-bearing members can be substituted for the pallets 34. In this example the pallets 34 are arranged in laterally aligned pairs along the lengths of the outer beams 22, 24 and thus define stations or index positions respectively along the length of the conveyor 20. Single pallets are similarly spaced along the length of the central beam support 28.

Each of the outer beams or supports 22, 24 is provided with elevating mechanism such as that illustrated in FIGS. 1 and 4 with respect to the beam or support 24. One arrangement of such elevating mechanism, denoted generally by reference character 36, includes a series of toggle linkages 38 spaced along the length of each of the supports 24 including the elongated segments thereof 22a and 24a. Each of the toggles 38 includes a pair of toggle links 40, 42 which are pivoted together at pivot pin 44 and at their outer extremities respectively to the support 22 or 24 and to the foundation structure 26 through pivot pins 46, 48, respectively.

Connected to the central pivot pins 44 of each of the toggle mechanisms 38 is a drawbar 50, which in turn is pivoted to distal end of piston rod 52 of an operating cylinder 54 (FIG. 1). Desirably the cylinder 54 is a hydraulic one having a relatively short stroke and is double-acting for the proper raising and lowering of the outboard supports or beams 22, 24 respectively.

As described in greater detail below, the toggle mechanisms 38 are not subjected to loads 56 until the toggle mechanisms 38 are at or very near their straightened or fully elevated positions, which are of course their maximum load-carrying positions. The toggle mechanisms 38, together with their actuating cylinders 54, can be constructed much more lightly than would be the case if the beams 22, 24 were elevated when fully loaded.

As better shown in FIGS. 1, 5 and 6 a similar elevating mechanism 58 for the central or inboard beam 28 is illustrated. The elevating mechanism 58 likewise includes a number of toggle mechanisms 38' spaced along the length of the beam segments 28a of the central walking beam 28. The central beam elevating mechanism 58 further includes a drawbar 50' (FIG. 6) pivoted to central pin 44' of each of the inboard toggle mechanisms 38' and to the associated piston and cylinder arrangement 54' (FIGS. 1 and 2). However, the lower extremity of the lower toggle line 42' of each toggle mechanism 38' is pivoted at its pin 48' to bracket 60 on one of carriage segments 62 (FIGS. 1 & 6) of a tandem carriage train 64. The carriage segments 62 can be joined by pivoted links 66 similar to the pivoted links 32 employed for joining the beam segments 22a, 24a, 28a. To provide a degree of mechanical flexibility in operation of the conveyor construction 20, each carriage train segment 62 is substantially coextensive with the corresponding central beam segment 28a mounted thereon. Depending upon the desired overall length of the conveyor construction 20, additional central beam segments 28a and carriage train segments 62 can be employed as required.

The actuating cylinder 54' for the inboard elevating mechanism 58 is likewise mounted on the associated carriage train segment 62 by means of cradle 68. To permit the cylinder 54' to follow the elevating motions of the drawbar 50', the cylinder 54' is pivotally mounted at 70 on its cradle 68. The cylinders 54 of the outer elevating mechanisms 36 are similarly mounted on cradles 72 which, however, are supported from the stationary foundation structure 26 of the conveyor construction 20.

Each of the carriage train sections 62 is provided with a number of pairs of railway trucks 74 engaging a pair of rails 76 extending along the anticipated path of movement of the central inboard walking beam 28 and its carriage structure 64. As better shown in FIGS. 1 and 2 the carriage 64 and the central walking beam 28 are reciprocated along the pair of rails 76 (arrow 78, FIG. 2) such that its load-bearing supports 34' can be coincided successively with adjacent pairs of load bearing supports 34 of the outer and longitudinally stationary supports 22, 24.

One arrangement for effecting longitudinal reciprocation of the inboard support 28 includes a long-stroke piston and cylinder arrangement 80 pivoted at 82 to a cradle or other suitable support 84 mounted on the foundation structure 26 for the conveyor 20. A distal end of piston rod 86 is pinned at 88 to the adjacent end of the carriage train 62. (FIG. 1). The length of the piston rod 86 and cylinder 80 are such that the inner or walking beam 28 can be reciprocated between its solid outline position illustrated in FIGS. 1 and 2 and its chain-outline position 90 shown in FIG. 2. In the chain-outline position 90 of the walking beam 28 the pairs of pallets or supports 34' spaced along the length thereof are laterally aligned with the pairs of pallets 34 spaced along the lengths respectively of the out-board beams or supports 22, 24. On the other hand, upon reciprocation of the central or walking beam 28 to its solid outline position (FIGS. 1 & 2) the pairs of supports 34' thereof are indexed to the similar position of lateral alignment with the outer supports 34 but with the array of such supports commencing with the outer supports 34a and extending to the right thereof, as viewed in FIG. 2.

At the solid outline position of the walking beam 28 its endmost or delivery pallet 34'a and adjacent portions of the beam 28a and carriage 64 are extended in cantilever fashion beyond the right-hand end of the rails 76 and beyond the foundation structure 26. At this position the load 56a on the delivery pallet 34'a of the central beam or support 28 can be positioned over a coil transfer car 92 or other suitable conveyance means, depending upon the weight and shape of the load to be transferred.

In the illustrated arrangement the transfer car 92 includes elevatable load engaging supports or rollers 94 which can be raised into a position of engagement with the endmost load 56a. Thereupon the walking beam 28 can be lowered sufficiently from the load 56a and retracted longitudinally to its chain-outline position 90 shown in FIG. 2.

The transfer car 92 can be arranged for movement transversely of the conveyor 20 (arrow 95) for movement between the delivery position, represented by coil 56a, of the conveyor 20 and for example a feed reel of a strip mill (not shown), or other suitable application. Naturally the coil can also be moved longitudinally, if desired. It can also be placed by a suitable elevating mechanism (not shown) directly onto a feed reel or other strip mill feed mechanism.

As better shown in FIGS. 1, 7 and 8 at least the inner or walking beam 28 is provided with a stabilizing arrangement operable during elevation thereof by means of the toggle mechanisms 38'. The stabilizing arrangement obviates any tendancy of the inner beam 28 to move laterally during elevation thereof or during the periods in which it is fully loaded at its fully raised condition. Such stabilizing means, one form of which is designated at 96 (FIGS. 7 & 8), prevents canting of the inner beam 28 and the imposition of unbalanced loading forces upon the toggle mechanisms 38' and other components of the walking beam 28. Stabilizing the walking beam 28 also obviates any possibility of canting and jamming of the inner beam 28 against the outboard beams or supports 22, 24. Similar stabilizing arrangements desirably are provided for the outboard beams 22, 24.

The stabilizing means 96 includes in this example a number of uprights 98 and braces therefor 100 rigidly secured to the upper surface of the carriage 62, as by welding. The stabilizing uprights 98 are shaped to fit relatively closely within depending sidewalls 102 (FIG. 7) of the beam supports, in this example the central beam 28. The close fitted insertion of the stabilizing uprights 98 into the associated beam or support prevents any substantial lateral movement thereof.

To ensure proper operation of the elevating mechanism 58 for the central beam 28 it is also essential to preclude any substantial longitudinal movement of the central beam 28 relative to its carriage 64. This is accomplished by a pair of rollers 104, 106 mounted on stub shafts 108, 110 which are in turn secured to the depending sidewalls 102 of the inboard beam 28. The rollers 104, 106 are displaced along the length of the beam or support 28 such that the stabilizing plate 98 is engaged therebetween. Such engagement obviates any substantial longitudinal movement of the inner beam 28 relative to its carriage arrangement 62. Suitable bearings not shown can be mounted between the rollers 104, 106 and their stub shafts 108, 110.

As noted previously the outer beams or supports 22, 24 are not moved longitudinally but only vertically with respect to the foundation or other support 26 of the conveyor construction 20. It is also desirable to prevent any substantial lateral and longitudinal movement of the outboard beams 22, 24 relative to the foundation 26. This is necessary, as in the case of the inboard beam relative to its carriage 62, for proper actuation of the toggle mechanisms 38 and to prevent lateral engagement of the outer support 22 or 24 with the inner support 28. The outer beams or supports 22, 24 can be stabilized throughout their vertical or elevating movements by a stabilizing arrangement similar to the mechanism 96 illustrated in FIGS. 7 & 8 for the central beam 28. The stabilizing plates (not shown) for the outer beams 22, 24 would, of course, be rigidly secured to the foundation structure 26 for insertion respectively between sidewalls 112 of the beam 22 or sidewalls 114 of the beam 24 (FIG. 3).

In operation of the conveyor construction 20, one or more strip coils 56, or other suitable loading are placed on the entry pallets 34b (FIGS. 1 & 2) of the outer conveyor beams 22, 24 and on other pairs of unloaded pallets 34 as desired. It will now be assumed that both inner and outer beams are in their fully raised positions and that the inner beam 28 is in its chain outline position 90 of FIG. 2. The entry coil 56c (FIG. 1) is thus supported on pallet 34'b of the inner beam 28 and on pallets 3b of the outer beams 22, 24.

The outboard beams 22, 24 are then lowered to leave the initial or entry load 56c resting entirely on the entry pallet 34'b of the intermediate beam 28. This is accomplished by actuating cylinders 54 of the elevating mechanisms 36 so as to lower the outer beams. The inner beam arrangement 28 is then advanced longitudinally so that its entry pallet 34'b is laterally aligned with the second pallets 34a of the longitudinally stationary or outer beams 22, 24. The entry load (56c) is thus advanced to the second station of the conveyor 20 as represented by load 56b in FIG. 1. The outer beams 22, 24 are again raised such that their second station pallets 34a engage the load 56b. Simultaneously other pallets 34 of the outer beams 22, 24 engage other loads 56 (FIG. 1) that may have been deposited along the length of the conveyor 20. The inner beam 28 is then lowered to leave the load 56b and any other loads of the conveyor resting entirely on respective pallets 34 of the outer beams 22, 24. The inner beam 28 is then retracted in its lowered position from its solid outline position of FIGS. 1 & 2 to its entry or chain-outline position 90 (FIG. 2).

When thus retracted to its chain-outline position the inner beam 28 is again raised such that its pallets 34' again and respectively engage all of the loads 56 upon the conveyor 20 including desirably another new entry load 56c. Upon lowering the outer beam supports 22, 24 and leaving all of the loads again upon the inner beam 28, including the entry load 56c, the inner beam 28 is again reciprocated to the right, as viewed in FIG. 1, while in its fully raised position, to commence a second cycle or index of the walking beam conveyor 20. This cyclic operation of the conveyor is continued desirably with additions of new loads such as the load 56c upon each return of the walking beam 28 to its chain-outline position 90 (FIG. 2), until the conveyor 20 is fully loaded as shown in FIG. 1. Thereafter with each subsequent reciprocation of the intermediate or walking beam 28 one of the loads 56 is delivered to the delivery position represented by load 56a, whereat a transfer car 92 or other suitable conveyance means removes the endmost or delivery load 56a from the walking beam 28 prior to each longitudinal retraction thereof to its starting position 90.

From the foregoing description it will be apparent that the loads 56 are transported at an essentially constant elevation from the entry load position (load 56c) to the delivery load position (load 56a). Thus the necessity of raising and lowering the individual beams or supports of the conveyor 20 under either partial or full loading is obviated. In consequence, the various toggle mechanisms 38 and 38' of the outer and inner beams 22, 24, 28 can be less heavily constructed, together with their actuating cylinders 54 and 54', linkage 50, 50', and other associated components.

Of even greater importance, the several pivot connections of the toggle mechanisms and associated components are not subjected to the extreme wearing forces which would otherwise be encountered under extremely heavy loadings, such as the strip coils 56. In addition to conveying the loads 56 at an essentially constant elevation, it will be apparent that it is necessary to advance only one of the "walking beams" longitudinally of the conveyor, in the disclosed embodiment.

It is also readily apparent that the loads 56 are supported by the individual beams 22, 24, 28 when their toggle mechanisms 38 or 38' are at or near their fully extended positions where the mechanical advantage is nearly infinite. From an engineering point of view it may be desirable to afford the respective toggle mechanisms 38, 38' with a small amount of overlap, say one-sixteenth inch, to ensure a solid engagement between the loads 56 and the beam or beams being raised into contact therewith, prior to lowering of the other beam or beams.

It is contemplated that the functions of the inner and outer beams as shown in FIGS. 1 & 2 can be relatively reversed such that the inner beam 28 is longitudinally stationary but elevatable with respect to the foundation 26 or other support, while the outer beams 22, 24 are mounted on respective carriage means (not shown) therefor and thus are longitudinally moveable in addition to their capability of vertical movement. It is also contemplated that different numbers of beams can be utilized depending on a given application of the invention.

From the foregoing it will be seen that a novel and efficient walking beam conveyor has been described herein. The descriptive and illustrative materials employed herein are utilized for purposes of exemplifying the invention and not in limitation thereof. Accordingly, numerous modifications of the invention will occur to those skilled in the art without departing from the spirit and scope of the invention. Moreover, it is to be understood that certain features of the invention can be used to advantage without a corresponding use of other features thereof.

I claim:

1. A conveyor construction for conveying articles at a substantially constant elevation, said conveyor construction comprising a longitudinally stationary but vertically movable first support structure, a longitudinally and vertically movable second support structure, said second support structure being supported from carriage means substantially coextending therewith by a number of toggle mechanisms spaced therealong, said carriage means extending generally parallel with said first support structure, said toggle mechanisms being actuated by a drawbar extending along the length of said second support structure, means mounted on said carriage means for reciprocating said drawbar for raising and lowering said second support structure relative to said carriage means, a plurality of load bearing stations spaced along the length of each of said support structures and laterally alignable one with the other, means for reciprocating said carriage means and said second support structure between positions of longitudinally lateral alignment of said second support stations with successively adjacent first support stations, and means for raising and lowering said first support structure for vertically lateral alignment of said stations at said constant elevations.

2. The combination according to claim 1 wherein said first support structure includes a pair of laterally spaced and generally parallel beam supports, and said second support structure is mounted therebetween for movement longitudinally thereof.

3. The combination according to claim 2 wherein a plurality of load-bearing pallets are mounted on and spaced along the length of each of said beam supports and said second support structure.

4. The combination according to claim 1 wherein said carriage means are provided with railway trucks or the like for engagement with rail means coextending with the anticipated path of movement of said carriage means and said second support structure, said reciprocating means having a reciprocatory throw equal in length to the distance between adjacent load stations on said first support structure.

5. The combination according to claim 1 wherein stabilizing means are provided for at least one of said support structures for stabilizing the support structure both laterally and longitudinally relative to said conveyor construction.

6. A conveyor construction for conveying articles at a substantially constant elevation, said conveyor construction comprising a longitudinally stationary support structure, a longitudinally movable support structure, said movable support structure being supported from carriage means substantially coextending therewith by a number of toggle mechanisms spaced therealong, said carriage means extending generally parallel with said stationary support structure, said toggle mechanisms being actuated by a drawbar extending along the length of said movable support structure, means mounted on said carriage means for reciprocating said drawbar for raising and lowering said movable support structure relative to said carriage means, a plurality of load bearing stations spaced along the length of each of said support structures and laterally alignable one with the other, means for reciprocating said carriage means and said movable support structure between positions of lateral alignment of said movable support stations with successively adjacent stationary support stations, said movable support structure and said carriage means being subdivided into longitudinal segments thereof respectively, and means for loosely joining end-to-end the segments of said movable support structure and the respectively associated segments of said carriage means.

7. The combination according to claim 6 wherein said stationary support structure is subdivided into longitudinal segments similarly and loosely joined.

8. A conveyor construction for conveying articles at a substantially constant elevation, said conveyor construction comprising a longitudinally stationary support structure, a longitudinally movable support structure, said movable support structure being supported from carriage means substantially coextending therewith by a number of toggle mechamisms spaced therealong, said carriage means extending generally parallel with said stationary support structure, said toggle mechanisms being actuated by a drawbar extending along the length of said movable support structure relative to said carriage means, a plurality of load bearing stations spaced along the length of each of said support structures and laterally alignable one with the other, means for reciprocating said carriage means and said movable support structure between positions of lateral alignment of said movable support stations with successively adjacent stationary support stations, stabilizing means for at least one of said support structures for stabilizing the support structure both laterally and longitudinally relative to said conveyor construction, said stabilizing means including at least one upright member closely inserted between spaced and depending side walls of the associated support structure for stabilizing said support structure against lateral deflection or movement thereof, and roller means mounted on said support structure for bearing engagement with opposite sides of an associated one of said upright members for stabilizing said support structure against relative longitudinal movement.

9. A conveyor construction for conveying articles at a substantially constant elevation, said conveyor construction comprising a longitudinally stationary support structure, said movable support structure being supported from carriage means substantially coextending therewith by a number of toggle mechanisms spaced therealong, said carriage means extending generally parallel with said stationary support structure, said toggle mechanisms being actuated by a drawbar extending along the length of said movable support structure, means mounted on said carriage means for reciprocating said drawbar for raising and lowering said movable support structure relative to said carriage means, a plurality of load bearing stations spaced along the length of each of said support structures and laterally alignable one with the other, means for reciprocating said carriage means and said movable support structure between positions of lateral alignment of said movable support stations with successively adjacent stationary support stations, said longitudinally stationary support structure being supported from a suitable foundation by a plurality of similarly actuated toggle mechanisms for elevation of said longitudinally stationary support structure.

* * * * *